(12) United States Patent  
Choi

(10) Patent No.: US 6,748,397 B2  
(45) Date of Patent: Jun. 8, 2004

(54) FILE STRUCTURE FOR PREVENTING EDITION AND DELETION IN INTERNET, A VARIETY OF COMPUTERS AND COMPUTER APPLICATION MEDIA, ADVERTISING METHOD USING THE FILE STRUCTURE AND SYSTEM USED FOR THE METHOD

(76) Inventor: Choo Hwan Choi, Jukong Apt. 517-104, 721 Sangkye-dong, Nowon-gu, Seoul (KR)

( * ) Notice: Subject to any disclaimer, the term of this patent is extended or adjusted under 35 U.S.C. 154(b) by 286 days.

(21) Appl. No.: 09/777,742

(22) Filed: Feb. 6, 2001

(65) Prior Publication Data

US 2001/0013039 A1 Aug. 9, 2001

(30) Foreign Application Priority Data

Feb. 8, 2000 (KR) .......................................... 2000-5765  
Mar. 24, 2000 (KR) ......................................... 2000-15209  
Feb. 2, 2001 (KR) .......................................... 2001-5045

(51) Int. Cl.[7] ........................... G06F 7/00; G06F 17/30; G06F 11/30; G06F 9/00; G06F 17/60
(52) U.S. Cl. ........................ 707/104.1; 707/3; 713/193; 713/165; 705/14
(58) Field of Search .................... 707/104.1, 3; 705/14; 713/193, 165

(56) References Cited

U.S. PATENT DOCUMENTS

| | | | | |
|---|---|---|---|---|
| 5,857,189 A | * | 1/1999 | Riddle | 707/10 |
| 5,910,987 A | * | 6/1999 | Ginter et al. | 380/24 |
| 6,014,698 A | * | 1/2000 | Griffiths | 709/224 |
| 6,405,203 B1 | * | 6/2002 | Collart | 707/10 |
| 6,452,611 B1 | * | 9/2002 | Gerba et al. | 345/721 |
| 6,463,585 B1 | * | 10/2002 | Hendricks et al. | 725/35 |

* cited by examiner

*Primary Examiner*—Safet Metjahic  
*Assistant Examiner*—Cindy Nguyen  
(74) *Attorney, Agent, or Firm*—Weiner & Burt, P.C.; Irving M. Weiner; Pamela S. Burt

(57) ABSTRACT

There are provided a file structure for preventing edition and deletion in the Internet, a variety of computers and computer application media, an advertising method using this file structure and a system adapted for this method, which is capable of providing various information items such as music, music video, movies, games and programs together with advertisements free to users through the Internet, a super fast communication network, a dedicated line network, or a general communication networks, and preventing an information file provided to the users from being reproduced if any one of the information, advertisement and header is edited or deleted.

51 Claims, 4 Drawing Sheets

FILE STRUCTURE FOR PREVENTING EDITION AND DELETION IN INTERNET, A VARIETY OF COMPUTERS AND COMPUTER APPLICATION MEDIA, ADVERTISING METHOD USING THE FILE STRUCTURE AND SYSTEM USED FOR THE METHOD

BACKGROUND OF THE INVENTION

1. Field of the Invention

The present invention relates to a file structure for preventing edition and deletion in the Internet, a variety of computers and computer application media, an advertising method using this file structure and a system used for this advertising method. More particularly, the invention relates to a file structure for preventing edition and deletion in the Internet, a variety of computers and computer application media, an advertising method using this file structure and a system adapted for this method, which is capable of providing various information items such as music, music video, movies, games and programs together with advertisements free to users through the Internet, a superfast communication network, a dedicated line network, or a general communication networks, and preventing an information file provided to the users from being reproduced if the information, advertisement, and/or header is edited or deleted.

2. Description of the Related Art

Sponsros pay a large amount of charges to a manager who manages a web server, various computers and computer application media for downloading a variety of information items such as music, music video, movies, games, programs and information data therefrom. The manager provides the various information items to the users free together with advertisements and is paid by sponsors for the provision of advertisements.

An example of information file structure provided to the users free from the web server, various computer and computer application media is shown in FIGS. 2A and 2B. The information file structure is configured of a header F3, an advertisement F2 (meaning information the sponsor or web server manager wants to deliver to the users) and information F1 such as music, music video, movies, games and programs. The information F1 means various information items the Internet users need, for example, music, music video, movies, games, programs and information data. The advertisement F2 is provided to the users together with the music, music video, movies, games, programs or information data by the manager who manages the web server, various computers and computer application media. The manager makes the users watch the advertisements and is paid for it by the sponsor. The header F3 means information for recognizing and correcting information and advertisement files.

In the prior art if an information provider delivers information such as music, music video, movie, game and program together with an advertisement loaded thereon to the users, the users can download the information and advertisement and then edit or delete unnecessary portions, thus deteriorating the advertising effect. Thus, the advertising effect cannot be used as a database on-line or off-line. Where a user downloads the advertisement together with information he requires from the web server, various computers and computer application media and then deletes the unnecessary advertisement, the advertising effect is decreased. Consequently, the manager cannot be sufficiently paid for provision of the information. Furthermore, the manager may miss an opportunity to form a new market because he cannot grasp the propensity of users to apply it to marketing.

SUMMARY OF THE INVENTION

It is, an object of the present invention to provide a file structure for preventing edition and deletion in the Internet, various computer and computer application media, which is capable of preventing reproduction of an information file, such as music, music video, movie, game and program, combined with an advertisement and provided to users free through the Internet or the like where a part or the whole part of the information file is edited or deleted, Another object to provide an advertising method using a file structure for preventing edition and deletion in the Internet, various computer and computer application media and a system used for this method, which is capable of providing users free with a variety of information items, such as music, music video, movies, games and programs through the Internet, general communication network or computer application recording medium and, when any one of an information file, an advertisement and a header which are combined to be provided to the users is edited or deleted, preventing the corresponding information file from being reproduced.

To accomplish these objects, there is provided a file structure for preventing edition and deletion in the Internet, various computers and computer application media, comprising: header data for recognizing advertisements and various information items, the header data including a blocking algorithm for blocking a specific file from being reproduced when any one of a header, an advertisement and information of the file is edited or deleted while the file is being reproduced; advertisement data for outputting sounds or images for an advertisement in a predetermined period of time; and information data configured of at least one of information files such as music, music video, movie, game and program a user requires.

In such a file structure, preferably; but not nesesarily the header further includes advertisement attribute information such as the type, the outputting time and the position on a screen of the advertisement. The type of the advertisement is at least one of sound, banner and moving picture. The header further includes an algorithm for connecting the user with the web server of a banner or moving picture advertisement when the user clicks it.

To accomplish these objects, there is provided an advertising method using a file structure for preventing edition and deletion in the Internet, various computers and computer application media, comprising: a first step of reading at least one information file among music, music video, movie, game and program files from an information database of a manager web server at the request of a user; a second step of reading an advertisement file from an advertisement database and combining the read information file with the read advertisement file; a third step for combining the header of the information file with which the advertisement file has been combined with a blocking algorithm for blocking the information file from being reproduced when a part or the whole part of the information file is edited or deleted, and converting it into a predetermined form; a fourth step in which the blocking algorithm operates to judge if the information file is edited, deleted or not when the user receives and reproduces the information file including the blocking algorithm; and a fifth step of blocking the information file from being reproduced when the blocking algorithm judges that a part or the whole part of the information file is edited or deleted, but reproducing the information file together with the advertisement having a predetermined form when the blocking algorithm judges that a part or the whole part of the information file is not edited or deleted.

In the aforementioned advertising method, preferably but not necessarily, the advertisement file selected by the manager of the web server is read from the advertisement database to be combined with the information file in the second step. The manager of the web server determines the type of advertisement or the number of advertising times on the basis of the sex, age and area of the user or the object the sponsor wants. In the second step, an advertisement file selected by the user who wants to download music, music video, movie, game or program is read from the advertisement database to be combined with the information file. The information file combined with the advertisement is delivered to the user from the web server via a communication means, such as Internet, dedicated line network, superfast communication network and general communication network.

Preferably, but not necessarily the user who receives the information file combined with the advertisement from the web server has at least a computer, a computer application medium such as CD and DVD, and/or a media player. The information file with which the advertisement is combined is reproduced while the user and the web server are on-line downloaded to the user and then reproduced, or provided to the user through a separate recording medium to be reproduced. Further, the advertisement combined with the information file is at least one of a sound advertisement, a banner advertisement and a moving picture advertisement. The sound advertisement is selectively outputted at the beginning time and/or finishing time of music, music video, movie, game or program. The banner is displayed on a predetermined position of a screen at the beginning time and finishing time of the music, music video, movie, game or program and during reproduction thereof. The moving picture advertisement is displayed on a predetermined position of a screen at the beginning time and finishing time of the music, music video, movie, game or program and during reproduction thereof.

It is preferable but not necessarily that the banner or moving picture advertisement includes a link function for connecting the user with the web server of the corresponding advertisement when the user clicks it. Another advertisement is read from the advertisement database of the web server in real time at the request of the user to replace the existing advertisement, to be combined with the information file before or during reproduction of the information file combined with the advertisement while the user and web server are in on-line state, and then the information file combined with the new advertisement is reproduced.

To accomplish the objects of the present invention, there is further provided an advertising method using a file structure for preventing edition and deletion in the Internet, various computers and computer application media, comprising: a first step of storing music files collected in a music file database, and collecting or producing moving picture advertisement files to store them by sponsors in an advertisement file database; a second step of searching for and reading a music file from the music file database at the request of a user, and searching for and reading a moving picture advertisement file to be combined with the music file from the moving picture advertisement file database; a third step of combining the read music file, the moving picture advertisement file and a blocking algorithm with one another by an advertisement and music combining algorithm to convert it to a predetermine form, and transmitting it to the user; a fourth step in which the blocking algorithm operates to judge if the music file is edited, deleted or not when the user receives and reproduces the music file having the blocking algorithm; and a fifth step of blocking the music file from being reproduced when it is judged that a part or the whole part of the music file is edited or deleted, but reproducing the music file with which the moving picture advertisement is combined using a computer, a computer application medium or a media player when it is judged that a part or the whole part of the music file is not edited or deleted.

In this advertising method, preferably, the user is authenticated by a manager web server for access thereto to be given a specific code value for receiving the music file and moving picture advertisement file and he can store log information or cookie file information in a log database. The moving picture advertisement files are classified by fields, and a moving picture advertisement field is selected at the request of the user to be searched and read from the moving picture advertisement file database, being combined with the music file. Member information of a member database inside an information database of the web server includes information about advertisements in the fields in which a member is interested and, when the music file is provided to the corresponding member, a moving picture advertisement file in the fields in which he is interested is searched and read from the moving picture advertisement file database to be combine with the music file.

Preferably, the user is authenticated by the web server for access thereto to receive an algorithm for separating the music file and moving picture advertisement file from each other from the web server and installs it before installation or reproduction of the music file combined with the moving picture advertisement file transmitted from the web server at the user side. When the user requests the web server to authenticate him for separating the music file from the moving picture advertisement file, the web serer searches information of the log database of the information database to judge standards, such as the period of time during which the music file with which a predetermined advertisement is combined is generated and maintained and the number of listening times of the user, are satisfied and, when they are satisfied, delivers the algorithm for separating the music file and moving picture advertisement file from each other to the user.

It is preferable that the information database of the web server further includes the log database storing log information configured of at least one of information about the position of the moving picture advertisement in the music file, information about the number of listening times of the user, information about the user who requests the music file, information about the copyright of the music file, and information about the music file and moving picture advertisement file combined therewith. The user combines the music file from which the moving picture advertisement file is separated with an advertisement audio file, and transmits it to the web server to store it therein if he wants it.

The advertising method further comprises a step in which the user judges the form of the music file separated from the moving picture advertisement file and the form of the advertisement audio file to convert them into predetermined forms (FMG, FPG).

In this advertising method, preferably, the header of the combined file of the music file and moving picture advertisement file includes information about the position of the moving picture advertisement in the music file, information about the number of listening times of the user, information about the user, information about the copyright of the music file, information about the music file and moving picture advertisement file combined therewith and link information about sponsors such that the user can instantly connect with a web server of corresponding sponsor if he wants when the music file combined with which the moving picture advertisement is reproduced. The number of times of reading each music file from the music file database and transmitting it and the number of times of reading a moving picture advertisement file of a specific sponsor from the moving picture advertisement database and transmitting it are respectively counted, and the royalty with respect to each music file and the advertising charge with respect to each advertisement are calculated on the basis of the number of times of transmitting the music file and the number of times of transmitting the moving picture advertisement file.

To accomplish the objects of the present invention, there is further provided an advertising system using a file structure for preventing edition and deletion in the Internet, various computers and computer application media, comprising: an information database configured of a database storing information provided to a user, such as music, music video, movie, game and program, and a database storing member information and log information; an advertisement database storing advertisement files by sponsors, the advertisement files being selected by a manager or the user to be combined with various information files, the advertisement files including a moving picture advertisement selected by a sponsor and the manager; a manager web server selectively reading an information file and an advertisement file selected by the user or manager to combine them with each other, combining it with a blocking algorithm for blocking the information file from being reproduced when a part or the whole part of the information file is edited or deleted, and then converting it into a predetermined form, to provide it to the user; a communication means, configured of the Internet, dedicated line network, super fast communication network or general communication network, for connecting the web server and the user with each other; and the user receiving the information file containing the advertisement file through the communication means to confirm if a part or the whole part of the information file is edited, deleted or not using the blocking algorithm, thereby determining reproduction of the information file.

In this advertising system, the web server comprises: an information file reading unit for reading at least one information at the request of the user from the information database storing various information items such as music, media, game and program; an advertisement file reading unit for reading an advertisement file from the advertisement database at the request of the user or manager; an information and advertisement files combining unit for combining the read information file and the read advertisement file with each other; an information and advertisement files converting unit for adding the blocking algorithm for blocking the information file from being reproduced when a part or the whole part of the information file combined with the advertisement file is edited or deleted and converting it into a predetermined form; and an information and advertisement files transmitting unit for transmitting the converted file to the user through the communication means.

It is preferable that, when a music file combined with an advertisement audio file is received by the user, the web server stores the music file at the request of the user.

DETAILED DESCRIPTION OF THE PREFERRED EMBODIMENT

Reference will now be made in detail to the preferred embodiments of the present invention, examples of which are illustrated in the accompanying drawings.

Figure 1:
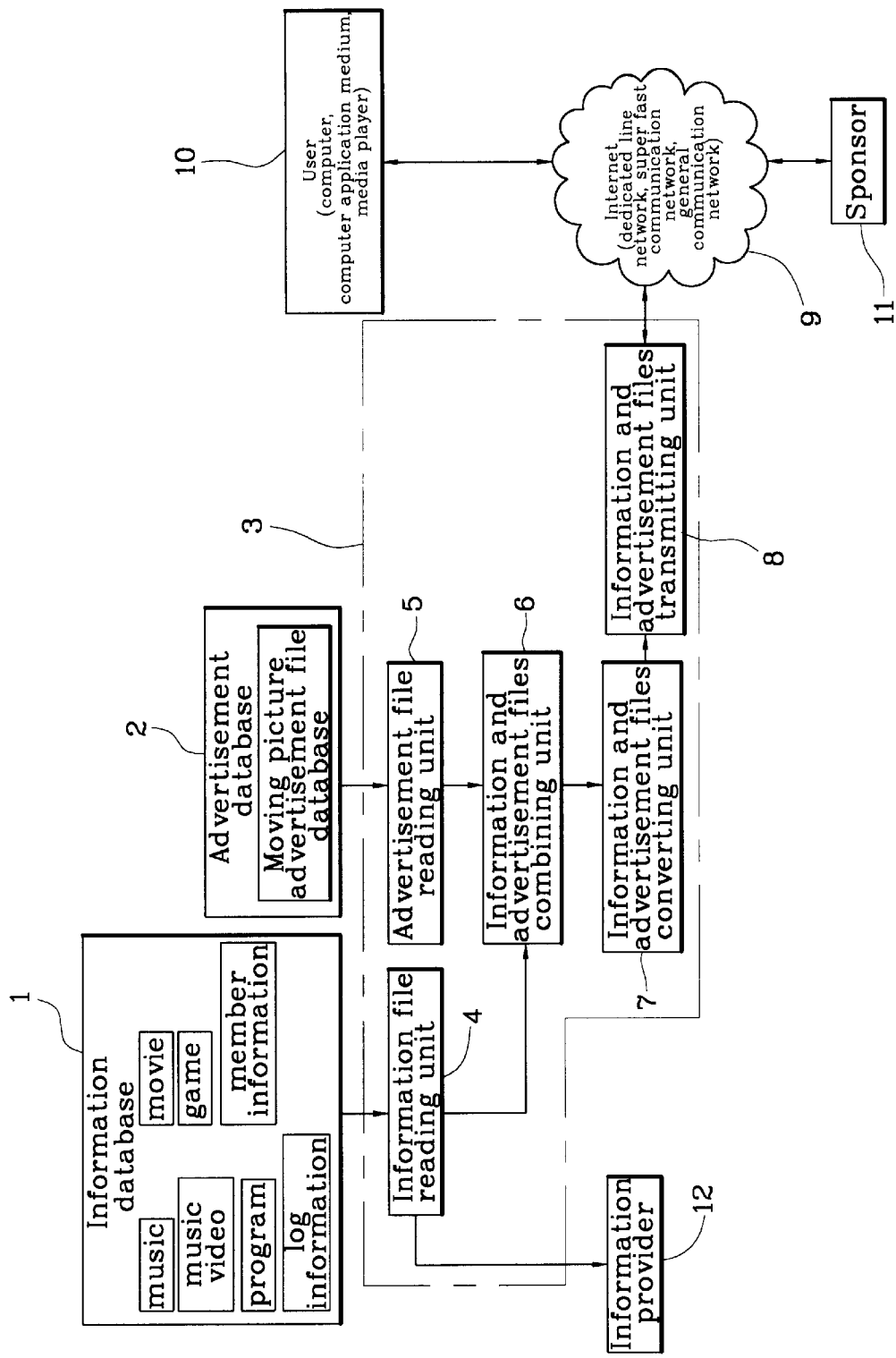
FIG. 1 shows a configuration of an advertising system using a file including an edition and deletion blocking function according to the present invention.

Referring to FIG. 1, an information database 1 connected to a web server 3 stores a variety of information items such as music, music videos, movies, games, programs, member information, log information, etc., and advertisement database 2 collects and stores various advertisement files inputted by sponsors and the web server manager by sponsors. These advertisement files are combined with the above-described information files according to a selection of the manager or a user. The information files may be provided by information providers 12 on the Internet as well as by the information database 1.

The web server 3 to which the information database 1 and advertisement database 2 are connected combines an information file read from the information database 1 according to a selection of the manager or user with an advertisement file read from the advertisement database 2, adds a blocking algorithm for blocking reproduction of the information file when a part or the whole part of the information file is edited or deleted, converts it into a predetermined form and provides it to a user 10. The user 10 is authenticated by the web server 3 for access thereto to be given a specific code value to receive music files and moving picture advertisement files and he can store information such as log information or cookie files in a log database of the information database 1.

The web server 3 is connected to the user 10 and a sponsor 11 via a communication means 9 such as Internet, dedicated line network, super fast communication network and general communication network. The user 10 which is configured of a computer, a computer application medium or media player, capable of being communicated with the web server 3, receives various information files including advertisement files through the communication means 9, confirms if a part or the whole part of the received information file is edited or deleted before reproduction of it, and prevents the corresponding information file from being reproduced when it is edited or deleted.

The web server 3 includes an information file reading unit 4, an advertisement file reading unit 5, an information and advertisement files combining unit 6, an information and advertisement files converting unit 7 and an information and advertisement files transmitting unit 8. Specifically, the information file reading unit 4 reads an information file at the request of the user 10 from the information database 1 in which music, music videos, movies, games and programs are stored. The advertisement file reading unit 5 reads an advertisement file at the request of the user or the manager from the advertisement database 2. The information and advertisement files combining unit 6 combines the information file with the advertisement file. The information and advertisement files converting unit 7 adds the blocking algorithm for blocking the information file from being reproduced when a part or the whole part of the information file is edited or deleted to the combined file and converts it into a predetermined form to provide it to the user 10. Finally, the information and advertisement files transmitting unit 8 delivers the file which has been converted into the predetermined form to the user 10 via the communication means. When the user receives a music file combined with an advertisement audio file, the web server 3 stores the music file with which the audio advertisement file is combined at the request of the user.

Figure 2A:
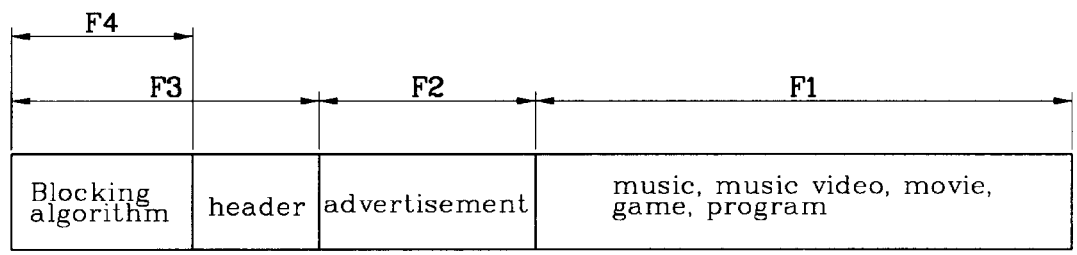
FIGS. 2A, 2B and 2C show file structures according to the present invention and prior arts.
Figure 2B:
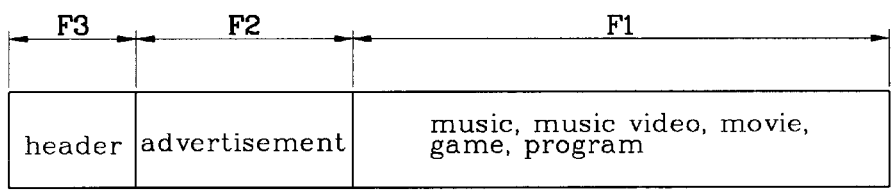
Figure 2C:
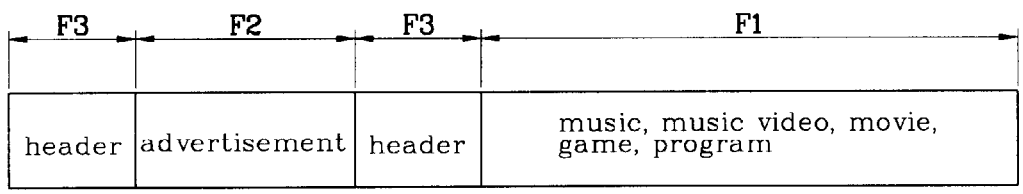

FIG. 2A shows the structure of information file, such as music, music video, movie, game and program, combined with an advertisement. Referring to FIG. 2A, the information file includes the blocking algorithm F4 for blocking reproduction of the file if any one of the header, advertisement and information is deleted or edited while the file is reproduced. The information file further includes the header F3 for recognizing the advertisement and information, the advertisement portion F2 for outputting sound and image (or moving image) for the advertisement by a predetermined period of time, and the information F1 configured of at least one of music, music video, movie, game and program the user requires.

The header F3 contains an advertisement attribute allowing a banner to be displayed depending on the type of advertisement and it can further include an algorithm for connecting the user with a web server of an advertisement when the user clicks on the advertisement. In addition, the header F3 also has attribute information for determining the location or size of the advertisement provided to the user.

Figure 3:
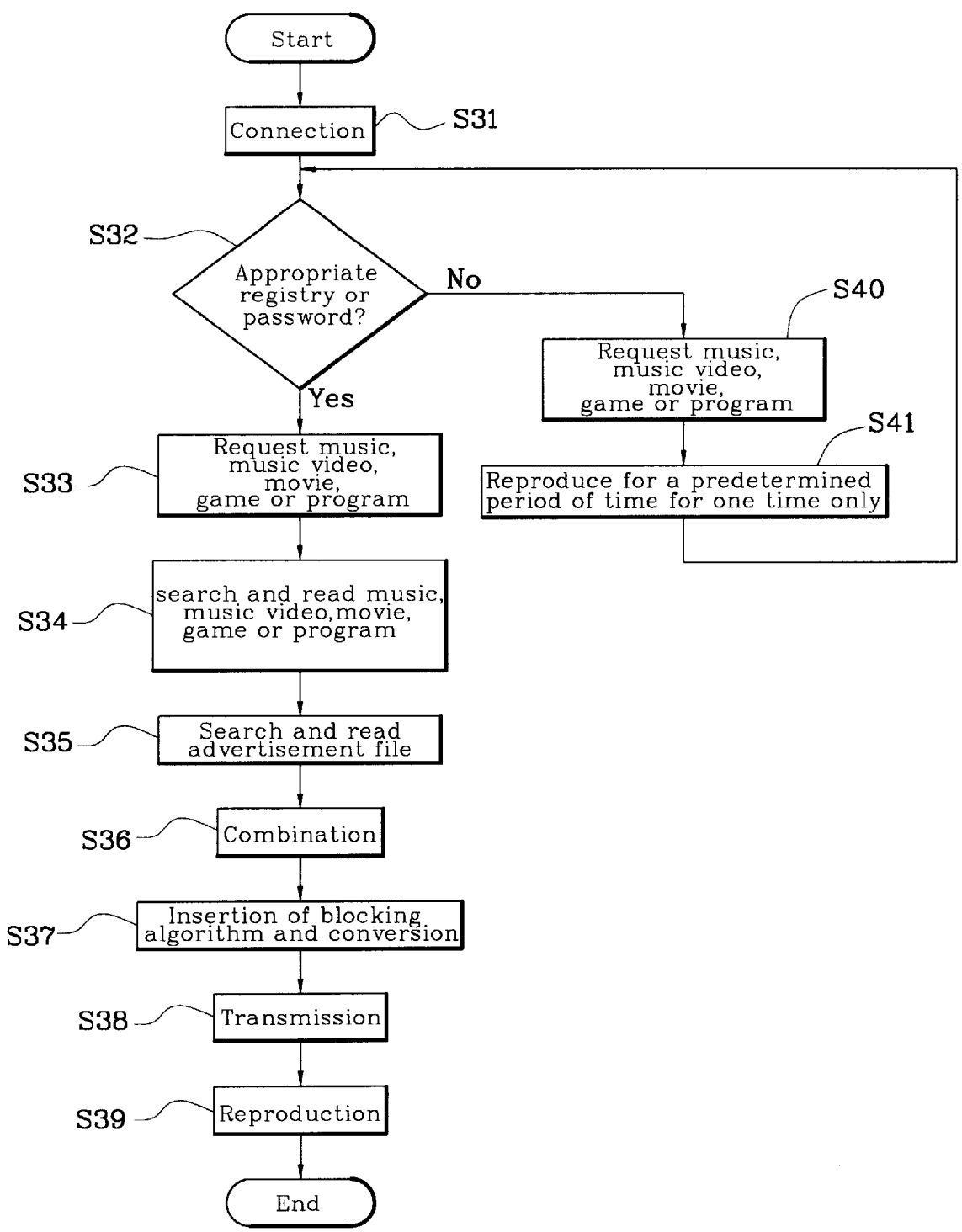
FIGS. 3 and 4 are flow diagrams for explaining an advertising method using the file structure including the edition and deletion blocking functions according to the present invention.
Figure 4:
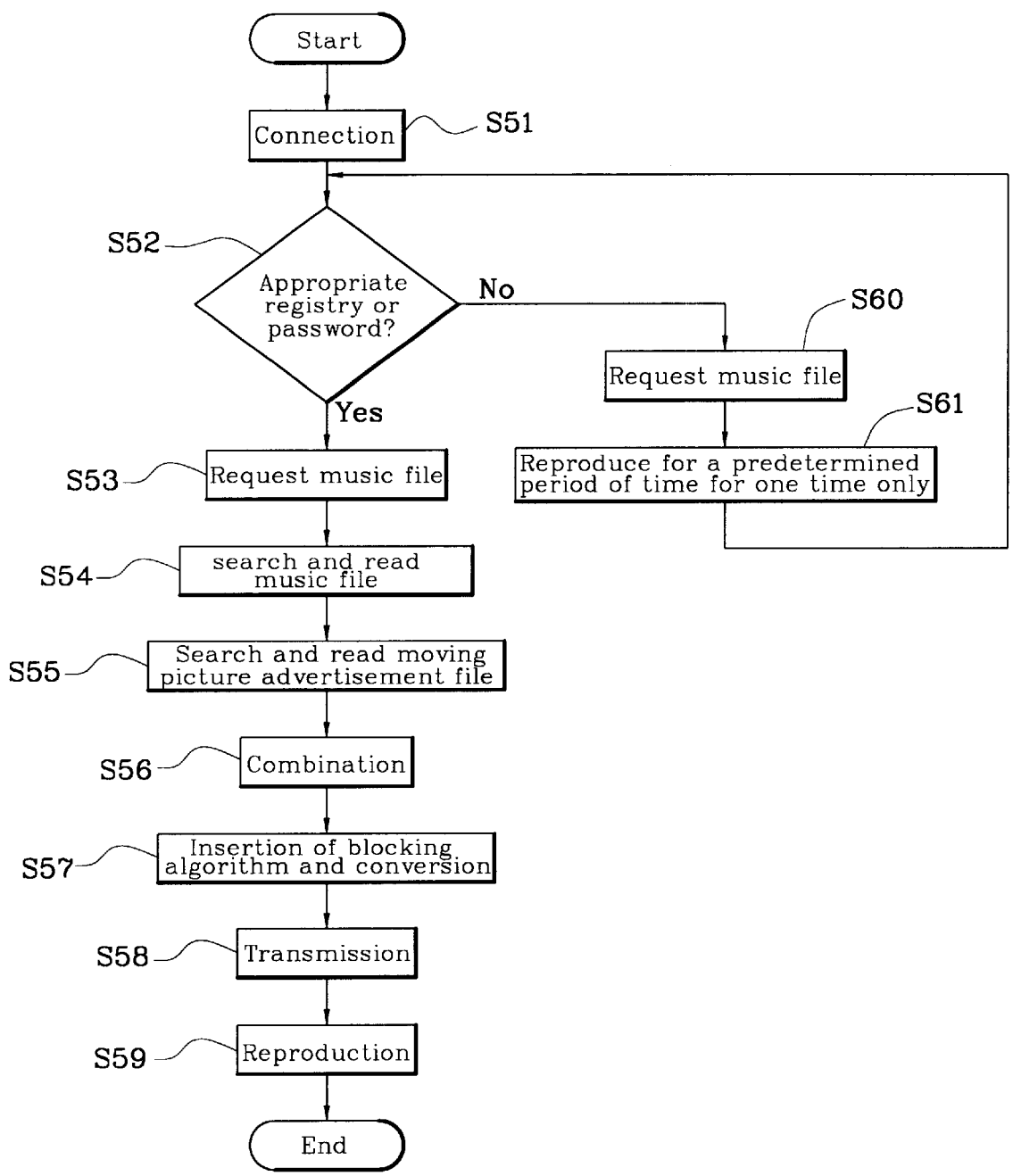

FIGS. 3 and 4 are flow diagrams showing a procedure of providing information including an advertisement to which the blocking algorithm is added to the user to reproduce it. Referring to FIGS. 1 and 3, when the user 10 is connected with the web server 3 through the communication means such as Internet, dedicated line network, super fast communication network and general communication network (S31), the web server 3 requests the user 10 to input a registry or password (S32). When the user 10 inputs an appropriate registry or password and then requires at least one of information files such as music, music videos, movies, games and programs (S33), the information file reading unit 4 of the web server 3 reads out a corresponding information file from the information database 1 (S34). Simultaneously, the advertisement file reading unit 5 reads out an advertisement file from the advertisement database 2. Here, while the advertisement file reading unit 5 can read out an advertisement selected by the user 10 from the advertisement database 2, it reads out an advertisement file arbitrarily selected by the web server 3 when the user 10 does not select an advertisement (S35). The type or number of advertising times of the advertisement selected by the manager of the web server 3 is determined on the basis the sex, age, area, occupation, etc. of the user 10 or an object the sponsor wants.

The read information file and advertisement file are combined with each other to be one file by the information and advertisement files combining unit (S36). The advertisement file may be combined with the information file at the beginning and finishing portions of the information file such as music, music video, movie, game and program. The advertisement can be repeatedly combined with the information file at a predetermined time interval or continuously combined with it.

The information and advertisement files converting unit 7 adds a header to the combined file and converts it into a predetermined form (S37). This header includes not only information for recognizing the advertisement and information but also the blocking algorithm for blocking reproduction of the file if the user edits or deletes a part or the whole part of the file consisting of the header, advertisement and information, an algorithm for controlling the form (from a simple sound advertisement to a banner or moving picture advertisement), the position on a screen and the advertising time of the advertisement, and a link function for connecting the user with a web server of the corresponding advertisement when the user clicks it.

As described above, the information file constructed in a manner that the header, advertisement and various information pieces are combined with one another is converted into a specific form adapted for being transmitted by the information and advertisement files transmitting unit 8 to be delivered to the user 10 which is configured of a computer or computer application medium such as CD and DVD or media player, capable of being connected to the web server 3, via the communication means 9 such as Internet, dedicated line network, super fast communication network and general communication network (S38).

When the user 10 reproduces the information file configured of the header, advertisement and information provided by the web server 3 (S39), the blocking algorithm combined with the header automatically operates to confirm if a part or the whole part of the information file is edited, deleted or not. When it is confirmed that it is not, the information file is normally reproduced to allow the user 10 to enjoy the music, music video, movie, game or program free and to watch the advertisement provided by the sponsor or manager. In contrast, when it is confirmed that the user 10 edits or deletes a part or the whole part of the information file, the blocking algorithm prevents the information file from being reproduced. Reproduction of the information file configured of the header, advertisement and information such as music, music video, movie, game and program will be described below in more detail.

The information file including music, music video, movie, game or program is reproduced by the user 10 having a computer, computer application medium or media player. Music and sound advertisements are outputted through a general speaker while banners or moving picture advertisements are displayed on a screen. In case where the advertisement reproduced together with the music, music video, movie, game or program is a sound advertisement, it can be selectively outputted at the beginning time and finishing time of the music, music video, movie, game or program. In case of a banner, it can be displayed on a predetermined position of the screen not only at the beginning time and finishing time of the music, music video, movie, game or program but also at any time during reproduction of music, music video, movie, game or program. In case of a moving picture advertisement, it also can be displayed on the screen for a predetermined period of time not only at the beginning time and finishing time of the music, music video, movie, game or program but also at any time during reproduction thereof.

The information file including the header, advertisement and at least one of music, music video, movie, game and program can be reproduced in real time while the user 10 and web server 3 are in on-line state or reproduced after the user 10 downloads it from the web server 3. Otherwise, it can be provided through a separate recording medium off-line to be reproduced. If the user 10 requests the web server 3 to change the advertisement file while being connected with the web server 3 before or during the reproduction of the advertisement combined with the music, music video, movie, game or program, the advertisement file reading unit 5 of the web server 3 reads the advertisement file the user 10 requests from the advertisement database 2. This advertisement file is processed by the information and advertisement files combining unit 6, information and advertisement files converting unit 7 and information and advertisement files transmitting unit 8, as described above, and then delivered to the user 10 via the communication means. By doing so, a new advertisement file is reproduced together with the music, music video, movie, game or program. The advertisement file which was combined with the information file is automatically deleted when the newly requested advertisement file replaces it.

Upon request for change of the advertisement file, the web server 3 preferably provides an advertisement list of the advertisement database 2 to the user 10 to allow the user to select an advertisement suited to his taste. Furthermore, the banner or moving picture advertisement includes the link function for connecting the user with the web server managed by the sponsor providing the advertisement so that the user 10 can visit the web server to confirm more detail contents of the advertisement by clicking it. Moreover, the user 10 can visit the web server of the corresponding advertisement to purchase a product or information corresponding to the advertisement.

Even when the registry or password of the user 10 is inappropriate at the step S31, the web server 3 reads the information file such as music, music video, movie, game and program the user 10 requires from the information database 1 to provide it to the user 10. Accordingly, the user 10 can receive and enjoy the music, music video, movie, game or program he requires for a predetermined period of time for one time only without watching the advertisement (S41). Even in this case, the manager of the web server 3 can combine the music provided free with an advertisement through the aforementioned procedure to provide it to the user.

FIG. 4 shows another embodiment of the present invention. Referring to FIGS. 1 and 4, the web server 3 collects a variety of music files from a variety of recording media, web servers and information providers to store them in a music file database of the information database 1. In addition, the web server 3 collects or produces moving picture advertisement files sponsors request and stores them in a moving picture advertisement file database of the advertisement database 2, classifying them by sponsors to store them. Specifically, the web server 3 stores the moving picture advertisement files in the advertisement file database, dividing them by their fields, selects the field the user 10 requires, searches and reads the moving picture advertisement files corresponding to the field from the moving picture advertisement file database to combine it with a music file.

Furthermore, the web server 3 may store information about advertisement fields in which a member thereof is interested together with member information in a member information database such that it can search and read a moving picture advertisement file in the field in which the member is interested from the moving picture advertisement file database when it provides the music file to the member to combine the read advertisement file with the music file.

When the user 10 is connected with the web server 3 through the Internet while the music files and moving picture advertisement files are respectively stored in the music file database and moving picture advertisement database as described above (S51), the web server 3 requests the user 10 to input a registry or password (S52). When the user 10 inputs an appropriate registry or password and then requires at least one music file (S53), the information file reading unit 4 of the web server 3 searches the music file database in the information database 1 to read out the corresponding music file therefrom (S54). Simultaneously, the advertisement file reading unit 5 searches the moving picture advertisement file database in the advertisement database 2 to read out an advertisement file therefrom (S55). Here, though the advertisement file reading unit 5 can read out a moving picture advertisement file selected by the user 10 from the moving picture advertisement file database, it reads out an advertisement file arbitrarily selected by the manager of the web server 3 when the user 10 does not select any moving picture advertisement file. The type or number of advertising times of the moving picture advertisement file is determined at the request of its sponsor or on the basis of the sex, age, area, occupation, etc. of the user 10.

The information and advertisement files combining unit 6 combines the music file, the moving picture advertisement file and the blocking algorithm into one file according to an algorithm for combination of music and advertisement (S56). This file is converted into a predetermined form by the information and advertisement files converting unit 7.

The header of the music file and moving picture advertisement file includes information about the position of the moving picture advertisement in the music file, information about the number of listening times of the user, information about the user who requests the music file, information about the copyright of the music file, information about the music file and moving picture advertisement file combined therewith and link information about the sponsor, so the user can instantly connect with the web server of the sponsor if he wants when the music file combined with the moving picture advertisement is reproduced.

The music file containing the moving picture advertisement and the header is converted into a predetermined form by the information and advertisement files transmitting unit 8 to be delivered to the user 10 having a computer or computer application medium such as CD and DVD, capable of being on-line communicated with the web server 3 through the Internet (S58).

When the user 10 reproduces the music file containing the moving picture advertisement and the header (S59), the blocking algorithm of the header operates to confirm if a part or the whole part of the file having the header, the moving picture advertisement file is edited, deleted or not. When it is confirmed that it is, the music file is not reproduced. On the contrary, when it is confirmed that it is not, the music file is normally reproduced together with the moving picture advertisement. Here, the user 10 can replace the moving picture advertisement file with a new one before or during reproduction of the music file while being connected with the web server 3 in on-line state. The new moving picture advertisement file is processed by the web server 3, with the existing one being automatically deleted, to be delivered to the user 10 through the Internet.

Even when the registry or password of the user 10 is inappropriate at the step S51, the web server 3 reads the music file requested by the user 10 from the music file database to provide it to the user 10 so that the user can enjoy the music for a predetermined period of time for one time only without watching the moving picture advertisement (S61). Even in this case, the manager of the web server 3 can combine the music provided free with a moving picture advertisement through the aforementioned procedure to provide it to the user.

Meanwhile, the user 10 can be authenticated to connect with the web server 3 and then download an algorithm for separating the music file from the moving picture advertisement file from the web server 3 before installation or reproduction of the moving picture advertisement file and music file transmitted from the web weber3 at the user side. Specifically, when the user 10 requests the web server 3 for authentication in order to separate the music file and moving picture advertisement file from each other, the web server 3 searches a log database of the information database 1 to judge if a period of time during which a music file combined with a predetermined advertisement is generated and maintained or the number of music file listening times of the user is satisfied. When it is, the web server 3 delivers the algorithm for separation of the music file and moving picture advertisement file from each other to the user 10. Here, the log database of the information database 1 stores log information configured of at least one of information about the position of the moving picture advertisement file in the music file, information about the number of music file listening times of the user, information about the user who requests the music file, information about the copyright of the music file, and information about the music file and moving picture advertisement file combined therewith.

After authentication by the web server 3, the user 10 can separate the music file from the moving picture advertisement file. Furthermore, the user 10 can combine an advertisement audio file with the music file from which the moving picture advertisement file was separated and transmit the combined file to the web server 3 to store it therein. Here, the user 10 judges the forms of the music file from which the moving picture advertisement file was separated and the advertisement audio file and converts them into predetermined forms (FMG, FPG) to deliver them to the web server 3. Especially, the number of times of reading a music file from the music file database to transmit it to the user 10 and the number of times of reading a moving picture advertisement file of a specific sponsor from the moving picture advertisement database to transmit it to the user are respectively counted such that the royalty with respect to the music file and the advertising rate for the advertisement file can be calculated on the basis of the number of times of transmission the music file and moving picture advertisement file. In addition, the musical taste of the user can be grasped.

As described above, the present invention converts the structure of a file such as music, movies, music videos, games and programs, currently distributed with charges on the Internet and computer application media. That is, the invention provides a new program technique which combines an advertisement with a file and provides it to users free. Accordingly, the present invention can not only provide information such as music, movies, music videos, games and programs to the users via the Internet, dedicated line network, super fast communication network or general communication network but also prevent the information file, advertisement file and header provided to the users from being edited or deleted in advance.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. An advertising method using a file structure for preventing edition and deletion in the Internet, various computers and computer application media, comprising:
    a first step of reading at least one information file among music, music video, movie, game and program files from an information database of a manager web server at the request of a user;
    a second step of reading an advertisement file from an advertisement database and combining the read information file with the read advertisement file;
    a third step for combining the header of the information file with which the advertisement file has been combined with a blocking algorithm for blocking the information file from being reproduced when a part or the whole part of the information file is edited or deleted, and converting it into a predetermined form;
    a fourth step in which the blocking algorithm operates to judge if the information file is edited, deleted or not when the user receives and reproduces the information file including the blocking algorithm; and
    a fifth step of blocking the information file from being reproduced when the blocking algorithm judges that a part or the whole part of the information file is edited or deleted, but reproducing the information file together with the advertisement having a predetermined form when the blocking algorithm judges that a part or the whole part of the information file is not edited or deleted.

2. The advertisement method as claimed in claim 1, wherein, in the second step, the advertisement file selected by the manager of the web server is read from the advertisement database to be combined with the information file.

3. The advertising method as claimed in claim 2, wherein the manager of the web server determines the type of advertisement or the number of advertising times on the basis of the sex, age and area of the user or the object the sponsor wants.

4. The advertising method as claimed in claim 1, wherein, in the second step, an advertisement file selected by the user who wants to download music, music video, movie, game or program is read from the advertisement database to be combined with the information file.

5. The advertising method as claimed in claim 1, wherein the information file combined with the advertisement is delivered to the user from the web server via a communication means such as Internet, dedicated line network, super fast communication network and general communication network.

6. The advertising method as claimed in claim 1, wherein the user who receives the information file combined with the advertisement from the web server has at least one of a computer, a computer application medium such as CD and DVD and a media player.

7. The advertising method as claimed in claim 1, wherein the information file with which the advertisement is combined is reproduced while the user and the web server are in on-line state, downloaded to the user and then reproduced, or provided to the user through a separate recording medium to be reproduced.

8. The advertising method as claimed in claim 1, wherein the advertisement combined with the information file is at least one of a sound advertisement, a banner advertisement and a moving picture advertisement.

9. The advertising method as claimed in claim 8, wherein the sound advertisement is selectively outputted at the beginning time and/or finishing time of music, music video, movie, game or program.

10. The advertising method as claimed in claim 8, wherein the banner is displayed on a predetermined position of a screen at the beginning time and finishing time of the music, music video, movie, game or program and during reproduction thereof.

11. The advertising method as claimed in claim 8, wherein the moving picture advertisement is displayed on a predetermined position of a screen at the beginning time and finishing time of the music, music video, movie, game or program and during reproduction thereof.

12. The advertising method as claimed in claim 8, wherein the banner or moving picture advertisement includes a link function for connecting the user with the web server of the corresponding advertisement when the user clicks it.

13. The advertisement method as claimed in 1, wherein another advertisement is read from the advertisement database of the web server in real time at the request of the user to replace the existing advertisement to be combined with the information file before or during reproduction of the information file combined with the advertisement while the user and web server are in on-line state, and then the information file combined with the new advertisement is reproduced.

14. An advertising method using a file structure for preventing edition and deletion in the Internet, various computers and computer application media, comprising:
   a first step of storing music files collected in a music file database, and collecting or producing moving picture advertisement files to store them by sponsors in an advertisement file database;
   a second step of searching for and reading a music file from the music file database at the request of a user, and searching for and reading a moving picture advertisement file to be combined with the music file from the moving picture advertisement file database;
   a third step of combining the read music file, the moving picture advertisement file and a blocking algorithm with one another by an advertisement and music combining algorithm to convert it to a predetermine form, and transmitting it to the user;
   a fourth step in which the blocking algorithm operates to judge if the music file is edited, deleted or not when the user receives and reproduces the music file having the blocking algorithm; and
   a fifth step of blocking the music file from being reproduced when it is judged that a part or the whole part of the music file is entitled or deleted, but reproducing the music file with which the moving picture advertisement is combined using a computer, a computer application medium or a media player when it is judged that part or the whole part of the music file is not edited or deleted.

15. The advertising method as claimed in claim 14, wherein the user is authenticated by a manager web server for access thereto to be given a specific code value for receiving the music file and moving picture advertisement file and he can store log information or cookie file information in a log database.

16. The advertising method as claimed in claim 14, wherein the moving picture advertisement files are classified by fields, and a moving picture advertisement field is selected at the request of the user to be searches and read from the moving picture advertisement file database, being combined with the music file.

17. The advertising method as claimed in claim 14, wherein member information of a member database inside an information database of the web server includes information about advertisements in the fields in which a member is interested and, when the music file is provided to the corresponding member, a moving picture advertisement file in the fields in which he is interested is searched and read from the moving picture advertisement file database to be combine with the music file.

18. The advertising method as claimed in claim 14, wherein the user is authenticated by the web server for access thereto to receive an algorithm for separating the music file and moving picture advertisement file from each other from the web server and installs it before installation or reproduction of the music file combined with the moving picture advertisement file transmitted from the web server at the user side.

19. The advertising method as claimed in claim 14, wherein, when the user requests the web server to authenticate him for separating the music file from the moving picture advertisement file, the web server searches information of the log database of the information database to judge standards, such as the period of time during which the music file with which a predetermined advertisement is combined is generated and maintained and the number of listening times of the user, are satisfied and, when they are satisfied, delivers the algorithm for separating the music file and moving picture advertisement file from each other to the user.

20. The advertising method as claimed in claim 14, wherein the information server further includes the log database storing log information configured the position of the moving picture advertisement in the music file, information about the number of listening times of the user, information about the user who requests the music file, information about the copyright of the music file, and information about the music file and moving picture advertisement file combined therewith.

21. The advertising method as claimed in claim 14, wherein the user combines the music file from which the moving picture advertisement file is separated with an advertisement audio file, and transmits it to the web server to store it therein if he wants it.

22. The method as claimed in claim 14, further comprising a step in which the user judges the form of the music file separated from the moving picture advertisement file and the form of the advertisement audio file to convert them into predetermined forms (FMG, FPG).

23. The advertising method as claimed in claim 14, wherein the header of the combined file of the music file and moving picture advertisement file includes information about the position of the moving picture advertisement in the music file, information about the number of listening times of the user, information about the user, information about the copyright of the music file, information about the music file and moving picture advertisement file combined therewith and link information about sponsors switch that the user can instantly connect with a web server of corresponding sponsor if he wants when the music file combined with which the moving picture advertisement is reproduced.

24. The advertising method as claimed in claim 14, wherein the number of times of reading each music file from the music file database and transmitting it and the number of times of reading a moving picture advertisement file of a specific sponsor from the moving picture advertisement database and transmitting it are respectively counted, and the royalty with respect to each music file and the advertising charge with respect to each advertisement are calculated on the basis of the number of times of transmitting the music file and the number of times of transmitting the moving picture advertisement file.

25. An advertising system using a file structure for preventing edition and deletion in the Internet, various computers and computer application media, comprising:

an information database configured of a database storing information provided to a user, such as music, music video, movie, game and program, and a database storing member information and log information;

an advertisement database storing advertisement files by sponsors, the advertisement files being selected by a manager or the user to be combined with various information files, the advertisement files including a moving picture advertisement selected by a sponsor and the manager;

a manager web server selectively reading an information file and an advertisement file selected by the user or manager to combine them with each other, combining it with a blocking algorithm for blocking the information file from being reproduced when a part or the whole part of the information file is edited or deleted, and then converting it into a predetermined form, to provide it to the user;

a communication means, configured of the Internet, dedicated line network, super fast communication network or general communication network, for connecting the web server and the user with each other; and the user receiving the information file containing the advertisement file through the communication means to confirm if part or the whole part of the information file is edited, deleted or not using the blocking algorithm, thereby determining reproduction of the information file.

26. The advertising system as claimed in claim 25, wherein the web server comprises:

an information file reading unit for reading at least one information at the request of the user from the information database storing various information items such as music, media, game and program;

an advertisement file reading unit for reading an advertisement file from the advertisement database at the request of the user or manager;

an information and advertisement files combining unit for combining the read information file and the read advertisement file with each other;

an information and advertisement files converting unit for adding the blocking algorithm for blocking the information file from being reproduced when a part or the whole part of the information file combined with the advertisement file is edited or deleted and converting it into a predetermined form; and an information and advertisement files transmitting unit for transmitting the converted file to the user through the communication means.

27. The advertising system as claimed in claim 25, wherein, when a music file combined with an advertisement audio file is received by the user, the web server stores the music file at the request of the user.

28. A file structure for preventing edition and deletion in the Internet, various computers and computer application media, comprising:

first means for implementing a first step of reading at least one information file among music, music video, movie, game said program files from an information database of a manager web server at the request of a user;

second means for implementing a second step of reading an advertisement file from an advertisement database and combining the read information file with the read advertisement file;

third means for third step for combining the header of the information file with which been combined with a blocking algorithm for blocking the information file from being reproduced when a part or the whole part of the information file is edited or deleted, and converting it into a predetermined form;

fourth means for implementing a fourth step in which the blocking algorithm operates to judge if the information file is edited, deleted or not when the user receives and reproduces the information file including the blocking algorithm; and fifth means for implementing a fifth step of blocking the information file from being reproduced when the blocking algorithm judges that a part or the whole part of the information file is edited or deleted, but reproducing the information file together with the advertisement having a predetermined form when the blocking algorithm judges that a part or the whole part of the information file is not edited or deleted.

29. A file structure according to claim 28, wherein, in the second step, the advertisement file selected by the manager of the web server is read from the advertisement database to be combined with the information file.

30. A file structure according to claim 29, wherein the manager of the web server determines the type of advertisement or the number of advertising times on the basis of the sex, age and area of the user or the object the sponsor wants.

31. A file structure according to claim 28, wherein, in the second step, an advertisement file selected by the user who wants to download music, music video, movie, game or program is read from the advertisement database to be combined with the information file.

32. A file structure according to claim 28, wherein the information file combined with the advertisement is delivered to the user from the web server via a communication means such as Internet, dedicated line network, super fast communication network and general communication network.

33. A file structure according to claim 28, wherein the user who receives the information file combined with the advertisement from the web server has at least one of a computer, a computer application medium such as CD and DVD and a media player.

34. A file structure according to claim 28, wherein the information file with which the advertisement is combined is reproduced while the user and the web server are in on-line state, downloaded to the user and then reproduced, or provided to the user through a separate recording medium to be reproduced.

35. A file structure according to claim 28, wherein the advertisement combined with the information file is at least one of a sound advertisement, a banner advertisement and a moving picture advertisement.

36. A file structure according to claim 35, wherein the sound advertisement is selectively outputted at the beginning time and/or finishing time of music, music video, movie, game or program.

37. A file structure according to claim 35, wherein the banner is displayed on a predetermined position of a screen at the beginning time and finishing time of the music, music video, movie, game or program and during reproduction thereof.

38. A file structure according to claim 35, wherein the moving picture advertisement is displayed on a predetermined portion of a screen at the beginning time and finishing time of the music, music video, movie, game or program and during reproduction thereof.

39. A file structure according to claim 35, wherein the banner or moving picture advertisement includes a link function for connecting the user with the web server of the corresponding advertisement when the user clicks it.

40. A file structure according to claim 28, wherein another advertisement is read from the advertisement database of the web server in real time at the request of the user to replace the existing advertisement, to be combined with the information file before or during reproduction of the information file combined with the advertisement while the user and web server are in on-line state, and then the information file combined with the new advertisement is reproduced.

41. A file structure for preventing edition and deletion in the Internet, various computers and computer application media, comprising:

first means for implementing a first step of storing music files collected in a music file database, and collecting or producing moving picture advertisement files to store them by sponsors in an advertisement file database;

second means for implementing a second step of searching for and reading a music file from the music file database at the request of a user, and searching for and reading a moving picture advertisement file to be combined with the music file from the moving picture advertisement file database;

third means for implementing a third step of combining the read music file, the moving picture advertisement file and a blocking algorithm with one another by an advertisement and music combining algorithm to convert it so a predetermine form, and transmitting it to the user;

fourth means for implementing a fourth step in which the blocking algorithm operates to judge if the music file is edited, deleted or not when the user receives and reproduces the music file having the blocking algorithm; and fifth means for implementing a fifth step of blocking the music file from being reproduced when it is judged that a part or the whole part of the music file is edited or deleted, but reproducing the music file with which the moving picture advertisement is combined using a computer, a computer application medium or a media player when it is judged that a part or the whole part of the music file is not edited or deleted.

42. A file structure according to claim 41, wherein the user is authenticated by a manager web server for access thereto to be given a specific code value for receiving the music file and moving picture advertisement file and he can store log information or cookie file information in a log database.

43. A file structure according to claim 41, wherein the moving picture advertisement files are classified by fields, and a moving picture advertisement field is selected at the request of the user to be searched and real from the moving picture advertisement file database, being combined with the music file.

44. A file structure according to claim 41, wherein member information of a member database inside an information database of the web server includes information about advertisements in the fields in which a member is interested and, when the music file is provided to the corresponding member, a moving picture advertisement file in the fields in which he is interested is searched and read from the moving picture advertisement file database to be combine with the music file.

45. A file structure according to claim 41, wherein the user is authenticated by the web server for access thereto to receiving an algorithm for separating the music file and moving picture advertisement file from each other from the web server and installs it before installation or reproduction of the music file combined with the moving picture advertisement file transmitted from the web server at the user side.

46. A file structure according to claim 41, wherein, when the user requests the web server to authenticate him for separating the music file from the moving picture advertisement file, the web searcher searches information of the log database of the information database to judge standards, such as the period of time during which the music file with which a predetermined advertisement is combined is generated and maintained and the number of listening times of the user, are satisfied and, when they are satisfied, delivers the algorithm for separating the music file and moving picture advertisement file from each other to the user.

47. A file structure according to claim 41, wherein the information database of the web server further includes the log database storing log information configured of at least one of information about the position of the moving picture advertisement in the music file, information about the number of listening times of the user, information about the user who requests the music file, information about the copyright of the music file, and information about the music file and moving picture advertisement file combined therewith.

48. A file structure according to claim 41, wherein the user combines the music file from which the moving picture advertisement file is separated with an advertisement audio file, and transmits it to the web server to store it therein if he wants it.

49. A file structure according to claim 41 further comprising sixth step in which the user judges a step in which the user judges the form of the music file separated from the moving picture advertisement file and the form of the advertisement audio file to convert them into predetermined forms (FMG, FPG).

50. A file structure according to claim 41, wherein the header of the combined file of the music file and moving picture advertisement file includes information about the position of the moving picture advertisement in the music file, information about the number of listening times of the user, information about the users information about the copyright of the music file, information about the music file and moving picture advertisement file combined therewith and link information about sponsors such that the user can instantly connect with a web server of corresponding sponsor if he wants when the music file combined with which the moving picture advertisement is reproduced.

51. A file structure according to claim 41, wherein the number of times of reading each music file from the music file database and transmitting it and the number of times of reading a moving picture advertisement file of a specific sponsor from the moving picture advertisement database and transmitting it are respectively counted, and the royalty with respect to each music file and the advertising charge with respect to each advertisement are calculated on the basis of the number of times of transmitting the music file and the number of times of transmitting the moving picture advertisement file.

* * * * *